United States Patent [19]
Reed et al.

[11] 3,914,564
[45] Oct. 21, 1975

[54] AUTOMATIC BY-PASS DEVICE FOR A WATT HOUR METER SOCKET

[75] Inventors: Ronald H. Reed, Versailles; Raymond A. Diersing, Lexington, both of Ky.

[73] Assignee: Square D Company, Park Ridge, Ill.

[22] Filed: Aug. 22, 1974

[21] Appl. No.: 499,753

[52] U.S. Cl............................... 200/51.1; 317/107
[51] Int. Cl.²......................................... H01R 33/30
[58] Field of Search............ 200/51.09, 51.1, 51.11, 200/50 A, 50 B; 317/107

[56] References Cited
UNITED STATES PATENTS

| | | | |
|---|---|---|---|
| 2,747,049 | 5/1956 | Johansson | 200/50 A |
| 3,003,085 | 10/1961 | Rynd | 317/107 |
| 3,134,931 | 5/1964 | Kobryner | 317/107 |

*Primary Examiner*—David Smith, Jr.
*Attorney, Agent, or Firm*—Harold J. Rathbun; Harry G. Thibault

[57] ABSTRACT

A socket for a watt-hour meter is provided with an automatic by-pass means to prevent interruption of power to a load when the watt-hour meter is removed from the socket. The by-pass means comprises a pair of identical by-passing devices each having a pair of contact brackets. An end portion of one bracket of each pair is connected to a line terminal of the meter socket and an end portion of the other bracket of each pair is connected to a load terminal of the meter socket. An insulating contact housing is supported on the other end portions of the brackets of each pair, which other end portions are spaced apart to serve as stationary contacts. A spring-loaded bridging contact contained within each housing is driven away from the spaced end portions of the associated contact brackets by a plunger engageable with the watt-hour meter and is released when the meter is removed from the socket to bridge the spaced end portions of the associated contact brackets to complete a current path between the line and load terminals.

5 Claims, 4 Drawing Figures

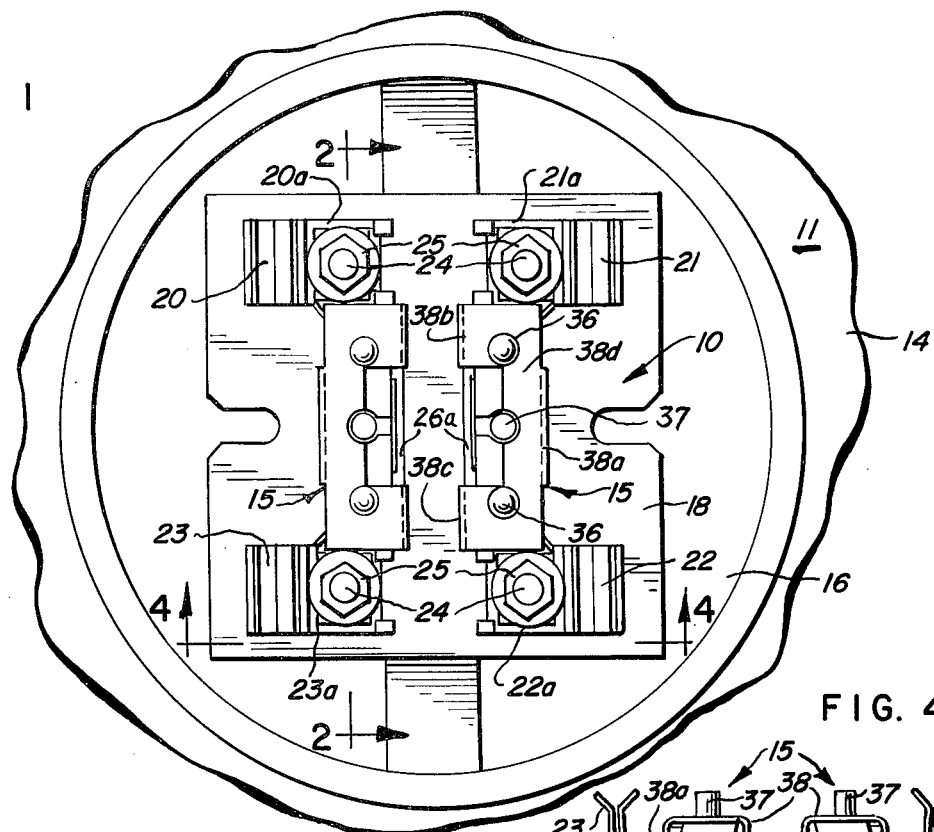

AUTOMATIC BY-PASS DEVICE FOR A WATT HOUR METER SOCKET

This invention relates to a by-pass means for a watt-hour meter socket and, more particularly to such a by-pass means which automatically prevents interruption of power when the meter is removed from the socket.

In order to test and re-calibrate a watt-hour meter, it is necessary to remove the meter from its socket. Because the current flowing to a load being metered must flow through the meter, removal of the meter from its socket interrupts the load current unless means are provided to complete an alternate path for it. Because of the nature of present day loads, even a momentary interruption of power is apt to be of material disadvantage. For example, most loads include one or more electric clocks so that an interruption of even a few seconds duration is noticeable and troublesome.

Prior meter by-pass means have comprised a pair of bridging contacts each of which is operated by a spring biased plunger. The plungers are depressed by the meter against the bias of the springs when the meter is plugged into its socket and are released to bridge respective pairs of stationary contacts when the meter is removed to complete the by-pass circuits. However, in prior by-pass means, it has been difficult to protect the meter socket from arcing between the bridging contacts and the stationary contacts. Insulator blocks integral with a base of the meter socket have been provided. Removable sheets of insulation have been placed around the contacts to protect against arcing. Because of the larger currents now being carried through meters of the plug-in type, it is desirable to provide a compact self-contained insulating barrier about the contacts to protect against arcing faults.

A watt-hour meter socket with which the by-pass means of this invention may be used comprises an enclosure containing a pair of load plug-in terminals and a pair of line plug-in terminals for receiving respective contact blades of a watt-hour meter of the plug-in type. The watt-hour meter, when plugged in, bridges the line and load terminals to supply current to the load through the meter. The meter socket is provided with the improved by-pass means for electrically interconnecting the line and load terminals so that the meter may be removed from the socket without interrupting electrical power flowing to a load being supplied through the meter.

In accordance with this invention, a by-pass means for such a meter socket is provided which comprises a pair of plungers each driving a spring biased bridging contact within its own enclosure. When the meter is removed from the socket, each bridging contact engages a pair of stationary contacts, the pair being electrically connected respectively to a line terminal and a load terminal of the socket. When the meter is replaced, the plungers are displaced against their bias to disengage the bridging contact from the stationary contacts. The stationary contacts are respective end portions of contact brackets which support the enclosures for the bridging contacts.

It is an object of this invention to provide, for use in a watt-hour meter socket, improved automatic by-pass means, the contacts of which are substantially enclosed and properly vented to confine and direct the contact arc.

A further object is to provide automatic meter by-pass means the contacts of which are within an enclosure supported by contact brackets which serve as stationary contacts.

Other objects and advantages of this invention will become apparent from the following specification wherein reference is made to the drawings, in which:

FIG. 1 is a front elevational view of a socket for a watt-hour meter which includes by-pass means constructed in accordance with this invention;

FIG. 2 is a sectional view of one of a pair of by-pass switch mechanisms of the by-pass means in the closed position and taken generally along the lines 2—2 of FIG. 1;

FIG. 3 is a view similar to FIG. 2 except that the by-pass switch mechanism is in the open position as it would be with a watt-hour meter installed in the socket; and FIg. 4 is a end view of the socket taken generally along the lines 4—4 of FIG. 1.

Referring to the drawings, a by-pass means 10 is shown mounted in a watt-hour meter socket 11 having a front cover portion 14 provided with a circular meter-receiving opening 16. The by-pass means 10 comprises a pair of identical by-pass switch mechanisms 15.

The socket 11 contains an insulating base 18 which supports a pair of plug-in line terminals 20, 21 and a pair of plug-in load terminals 22 and 23 of the spring-jaw type. The terminals 20, 21, 22 and 23 have respective inwardly extending base portions 20a, 21a, 22a, and 23a having respective apertures aligned with respective openings in the base 18. Screws 24 are appropriately secured to bus bars (not shown) and pass respectively through the openings in the base 18 and the aligned openings in the base portions 20a, 21a, 22a and 23a. Nuts 25 may be threaded onto the outer end portions of the respective screws 24 to complete the assembly and to secure the terminals 20, 21, 22 and 23 to the bus bars and to the base 18 with or without the by-pass means of this invention.

The by-pass switch mechanisms 15 of the by-pass means 10 are identical and thus description of one will suffice. Each mechanism 15 comprises a box-like receptacle 26 of rectangular cross-section suitably molded of resinous and insulating material and supported by a pair of Z-shaped contact brackets 34 and 35.

Each receptacle 26 has a cylindrical spring seat 30 projecting upwardly from a bottom wall, the seat 30 being apertured to receive a plunger 32, and each receptacle 26 is open-ended opposite the seat 30 with opposing outwardly directed flanges 27 and 28 at the open end of the receptacle. Each contact bracket 34 comprises a base portion 34a, a support leg portion 34b, and an upper supporting and contact portion 34c, and each Z-shaped contact bracket 35 has corresponding portions 35a, 35b and 35c. The upper supporting and contact portions 34c and 35c are off-set laterally from the corresponding base portions 34a and 35a as can be seen best in FIG. 4, and abut upper surfaces of the respective flanges 27 and 28. The contact brackets also abut a raised edge 26a (FIG. 4) of the receptacle 26 at the upper surface thereof. Rivets 36 secure the receptacle 26 to the brackets 34 and 35 at the supporting and contact portions 34c and 35c. Portions 34c and 35c extend toward each other across the top of each receptacle 26 of the receptacle to form an arc chamber.

The receptacle 26 has vents 26a and 26b (FIGS. 2 and 3) opposite its open end to discharge and direct the arc gases from the chamber. An insulating cover 38 having opposing downwardly directed side flanges 38a, 38b, and 38c rests on the upper surfaces of the contact portions 34c and 35c and the raised edge 26a and is also secured in position by the rivets 36. The insulating cover 38 partially covers the top surface of its associated receptacle 26 and the associated contact portions 34c and 35c and aids in directing arc gases discharged from the chamber.

Each cover 38 presents a U-shaped configuration at the top surface of its associated receptacle 26 with a base portion 38d extending longitudinally of the receptacle 26 and having its inner edge terminating at the longitudinal center line of the receptacle 26. The flange 38a of the cover 38 extends downwardly from the top surface of the receptacle 26 at one side edge to partially cover the receptacle at one side and the flanges 38b and 38c extend downwardly from the top surface of the receptacle 26 at the other side edge of the cover 38 to partially cover the receptacle at an opposite side.

The aperture in the seat 30 receives a lower end portion 32a of the plunger 32 which has an integral collar 40 at its midportion. The plunger 32 is composed of insulating material and has an enlarged upper end portion with an inwardly facing shoulder which forms a push button 37 extending between the spaced contact portions 34c and 35c. The inner end portions of the contact portions 34c and 35c are concave to accommodate the push button 37. A semicircular cut-out is also provided in the inner edge of the base portion 38d to accomodate the push button 37 of the plunger 32. A movable contact bridge 44 is slidably mounted on the plunger 32 beneath the collar 40 and is biased, toward or against the collar 40, by a helical compression spring 46 which, at its lower end, engages the base of the receptacle 26 at the outer circumference of the seat 30.

Each by-pass switch mechanism 15 may be secured to its associated pair of the line terminals 20 and 21 and load terminals 22 and 23 of the meter socket 11 by the nuts 25 on the screws 24, the screws 24 passing through openings in the base portions 34a and 35a of the brackets 34 and 35. The base portions 34a and 35a of one mechanism 15 are electrically connected to the terminals 20 and 23, respectively, and the base portions 34a and 35a of the other mechanism 15 are electrically connected to the terminals 22 and 21, respectively.

The operation of the by-pass assembly is as follows: When the watt-hour meter is in place, a base 48 of the watt-hour meter (not shown) depresses the plungers 32 of the devices 15, disengaging the contact bridges 44 from the upper contact portions 34c and 35c of the contact brackets 34 and 35. When the meter is removed, the spring 46 pushes the contact bridges 44 upwardly into engagement with the contact portions 34c and 35c to complete a circuit between the respective line and load terminals of the socket through brackets 34 and 35 and the contact bridges 44. With the contact bridges 44 in engagement with the contact portions 34c and 35c, current flow is restored to the meter socket. Further, when the watt-hour meter is replaced in the system, the base 48 of the meter engages the push buttons 37 to depress the plungers 32 and disengage the contact bridges 44 from the contact portions 34c and 35c and open the circuit. Thus the by-pass circuit is open when the meter is in place and is automatically closed when the meter is removed from the socket.

We Claim:

1. An automatic by-pass switching means for use with a meter socket for a watt-hour meter having two pairs of contact blades extending outwardly therefrom, the meter socket including a front cover portion having an opening therein and two pairs of spring-jaw terminals mounted in the socket in alignment with the opening in the front cover portion, connected to respective line and load terminals, and respectively adapted to receive the contact blades of the meter, the by-pass switching means being operable to provide continuous electrical service when the meter is removed from the meter socket and the contact blades are removed from the spring-jaw terminals, the by-pass switching means comprising a pair of by-pass switch mechanisms, each switch mechanism comprising a pair of Z-shaped contact brackets extending toward each other between respective line and load terminals of the meter socket and each having a base portion and a contact portion, the base portion of one contact bracket being secured to a load terminal of the meter socket and the base portion of the other contact bracket being secured to a line terminal of the meter socket, an open-ended insulating receptacle supported at opposite sides thereof by the contact portions, the contact portions extending across the open end of the receptacle to partially close the open end of the receptacle, a push rod having inner and outer portions on opposite sides of an inwardly facing shoulder, a seat in the receptacle for reciprocatively receiving the inner end portion of the push rod with the upper end portion of the push rod extending outwardly of the receptacle beyond the contact portions of the contact and slidably mounted on the push rod inwardly of the shoulder, and biasing means having opposite end portions, the biasing means having one end portion engaging the seat of the receptacle and the other end portion engaging the contact bridge, thereby to bias the contact bridge into engagement with the stationary contact portions when the watt-hour meter is not positioned in the socket, the outer end portions of the push rods of both switch mechanisms being positioned to be engaged by the base of the watt-hour meter when the watt-hour meter is positioned in the socket thereby to compress the biasing means and depress the slidable contact bridges of both switch mechanisms out of engagement with their associated stationary contact portions, whereby upon removal of the watt-hour meter from the meter socket the biasing means biases the contact bridges outwardly to engage their associated stationary contacts to provide an alternative current path between the line and load terminals of the meter socket.

2. An automatic by-pass switching means as claimed in claim 1 wherein removable securing means cooperate with the base portions of each switch mechanism so the mechanisms may be readily mountable on and removable from the terminals of the meter socket.

3. An automatic by-pass switching means as claimed in claim 2 wherein the contact portions of the switch mechanisms are offset laterally from the corresponding base portions of the switch mechanism.

4. An automatic by-pass switching means as claimed in claim 3 wherein additional insulating means are provided to further enclose the contacts of the switch mechanism.

5. An automatic by-pass switching means as claimed in claim 4 wherein the additional insulating means comprises an insulating cover partially enclosing the upper faces of the stationary contact portions of the switch mechanism, the cover having downwardly directed flanges which partially enclose the insulating receptacle.

* * * * *